(12) United States Patent
Anton et al.

(10) Patent No.: US 7,101,614 B2
(45) Date of Patent: Sep. 5, 2006

(54) FIRE-PROOF MATERIAL

(75) Inventors: Octavian Anton, Brüssel (BE); Xiao Wu, Zaventem (BE)

(73) Assignee: Promat International N.V., Tisselt (BE)

(*) Notice: Subject to any disclaimer, the term of this patent is extended or adjusted under 35 U.S.C. 154(b) by 95 days.

(21) Appl. No.: 10/381,206

(22) PCT Filed: Oct. 4, 2001

(86) PCT No.: PCT/EP01/11456
§ 371 (c)(1),
(2), (4) Date: Mar. 27, 2003

(87) PCT Pub. No.: WO02/28799
PCT Pub. Date: Apr. 11, 2002

(65) Prior Publication Data
US 2004/0101672 A1 May 27, 2004

(30) Foreign Application Priority Data
Oct. 5, 2000 (DE) .......................... 100 49 391

(51) Int. Cl.
*B32B 9/00* (2006.01)
*C04B 7/32* (2006.01)

(52) U.S. Cl. ................... 428/294.7; 428/332; 428/703; 106/461; 106/467; 106/470; 106/471

(58) Field of Classification Search ............. 428/294.7, 428/332, 703; 106/461, 467, 470, 471
See application file for complete search history.

(56) References Cited

U.S. PATENT DOCUMENTS

| 3,042,536 A | * | 7/1962 | Bishop | 106/695 |
| 4,101,335 A | * | 7/1978 | Barrable | 106/644 |
| 4,840,672 A | * | 6/1989 | Baes | 106/716 |

FOREIGN PATENT DOCUMENTS

| DE | 19517267 C1 | 1/1997 |
| EP | 0943590 A1 | 9/1999 |
| FR | 2091067 | 1/1972 |
| JP | 10310477 A | 11/1998 |

* cited by examiner

*Primary Examiner*—Jennifer McNeil
(74) *Attorney, Agent, or Firm*—Jacobson Holman PLLC

(57) ABSTRACT

The fire-protection material for constructions made of concrete and prestressed concrete, especially for tunnels, in the form of prefabricated plates or sprayed-on and cured coatings is prepared from hydraulically curing compositions containing aluminous cement, optionally in admixture with Portland cement, fillers and, if desired, fibers, curing accelerators, curing delayers, plasticizing agents and foaming agents, wherein the cured material contains less than 5% by weight of ettringite and wherein the composition contains from 50 to 200 weight parts of aluminous cement and from 10 to 250 weight parts of xonotlite in the uncured composition.

11 Claims, 5 Drawing Sheets

FIRE-PROOF MATERIAL

This is nationalization of PCT/EP01/11456, filed Oct. 4, 2001 and published in German.

The present invention relates to a fire-protection material, i.e., a material having good fire-protection properties for constructions made of concrete and prestressed concrete, especially for tunnels, in the form of prefabricated plates or sprayed-on and cured coatings prepared from hydraulically curing compositions containing aluminous cement, optionally in admixture with Portland cement, fillers and, if desired, fibers, curing accelerators, curing delayers, plasticizing agents and foaming agents.

A material having good fire-protection properties is the subject of DE C 195 17 267, said material being in the form of prefabricated plates or of a coating to be applied later to construction parts to be protected and consisting of a binder, synthetic xonotlite and at least 5% by weight of ettringite and/or metavariscite. This material has proven very useful, but is not capable of satisfying the higher demands which have been desired and in part already required in the meantime, especially for tunnels. Thus, it is required that, in the case of a fire, no irreparable damage must be caused by the loss of more than 50% of the original strength. The Netherlands require for immersed tunnels that the surface of the concrete core reaches a maximum of 380° C. and the maximum temperature at a distance of 25 mm from the surface of the concrete core reaches only 250° C. For drilled tunnels, this maximum surface temperature must not exceed 200 to 250° C.; cf. Both et al., TNO Centre for Fire Research, and Tan et al., Ministry of Public Works, The Netherlands. After the fire accident in the Mont Blanc tunnel, the desires for the fire-protection properties for tunnels are further increased.

The Dutch requirements for tunnels are based on the assumption that the combustion energy of a tank truck which had an accident results in a local heating which can be survived by the concrete core of the tunnel wall in a substantially undamaged condition. Thus, the test of this requirement is to show that a flat or bent plate which is mechanically attached to the surface of the concrete does not drop down; especially sprayed-on coatings tend to lose the adhesion and to detach. The test conditions are based on two hours, wherein the surface temperature of the concrete core must not exceed 200° C. for drilled tunnels and 380° C. for immersed tunnels, the thickness of the concrete being equal to or greater than 150 mm. The material for fire protection must withstand the heat shock, be resistant to abrasion and insensitive towards freeze/thaw cycles. The mechanical strength of this material in a three-point bending test should be as high as possible at 20° C. Preferably, it should be at least 7 MPa. The material should be resistant to chemical salts. Finally, it should be free of quartz for reasons of environmental protection and public health. The density of the material should be about 900 kg/m$^3$.

Previously known materials originally developed only for buildings and having good fire-protecting properties are those according to DE C 195 17 267, or the Promatect H plates manufactured by the Promat company, which are also employed in tunnel construction. These are autoclaved, fiber-reinforced lightweight construction plates on the basis of calcium silicates. They are prepared from Portland cement, silica, expanded pearlites, calcium hydroxide, fibers and other additives. Although employed for tunnel construction, they still fail to meet all the desires and requirements of fire protection for tunnels. In particular, these are the problems of delamination, restricted thickness and possible repair.

Other products of the prior art, which have in part also proven useful, also fail to meet the requirements of tunnel construction. U.S. Pat. No. 4,544,409 describes a material made of cements and trisodium phosphate hydrate. These products melt at relatively low temperatures and are therefore unsuitable for tunnels.

EP 0 769 482 describes a sprayable cement mortar with gypsum and calcium aluminate. This material is not capable either of meeting the requirements of tunnel construction. The same holds for the commercially available plates of the Kurosaki company which, according to analyses, consist of wollastonite, mullite, pearlites, glass fibers and synthetic fibers and are bonded with aluminous cement. They have a density of 1050 kg/m$^3$, but only a bending strength of 4 MPa.

EP 1 001 000, corresponding to WO 00/27948, describes a material which is supposed to be suitable also for tunnels and which contains a component which is volatile at high temperatures due to saw dust being admixed. In the meantime, this material has been placed on the market by the company Thermal Ceramics under the designation Fire Barrier 135. This material contains kaolin, which is not only expensive, but also shrinks upon strong heating to such an extent that the product becomes cracked. Further, the coating thickness and the adhesive strength are problematic.

Thus, it has been the object of the invention to provide a fire-protection material for constructions of concrete and prestressed concrete which meets the above mentioned enhanced desires and requirements for the fire protection of tunnel constructions and does not cause any health hazards in the case of a fire.

This object is achieved by a material which is prepared from a hydraulically curing composition containing aluminous cement, optionally in admixture with Portland cement, fillers and, if desired, fibers, curing accelerators, curing delayers, plasticizing agents and foaming agents, wherein the cured material contains less than 5% by weight of ettringite, characterized in that the composition contains from 50 to 200 weight parts of aluminous cement and from 10 to 250 weight parts of xonotlite in the uncured state. Preferably, the mixture is prepared from as many or twice as many weight parts of hydraulic binder as there are weight parts of xonotlite.

Figure 1:
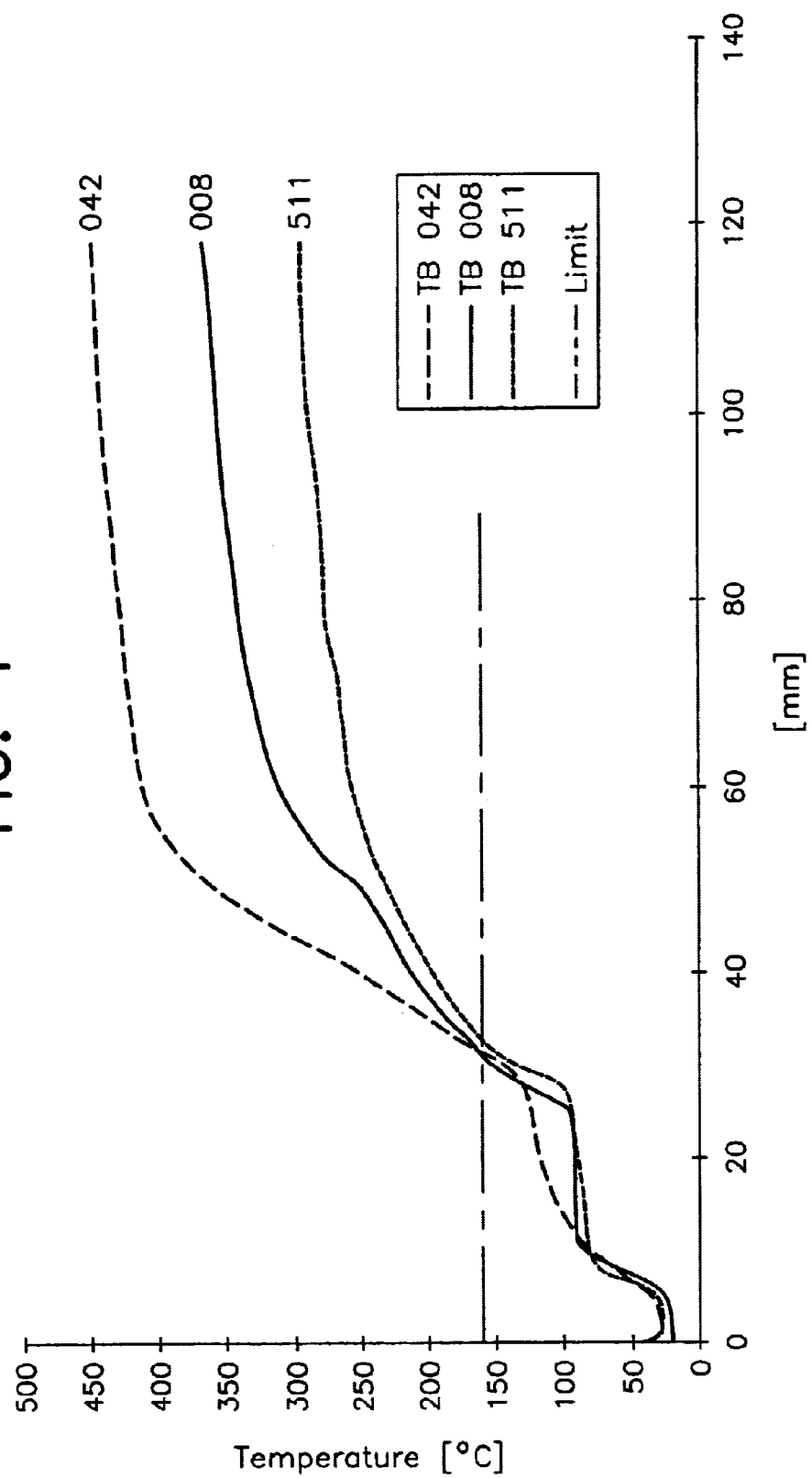
FIGS. 1 to 4 graphically present the data from testing for temperature-dependent properties of products according to the invention and comparative products.
Figure 2:
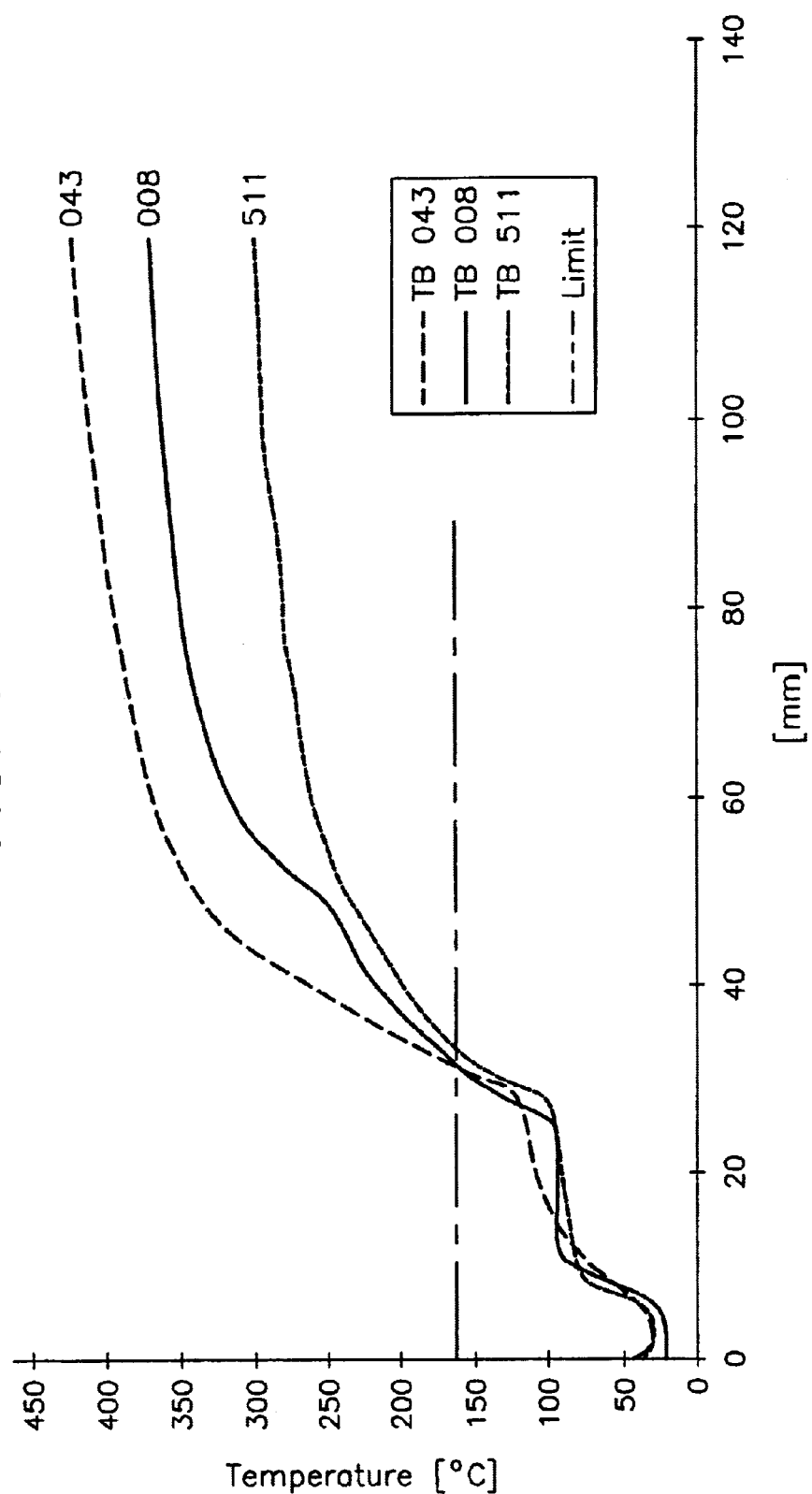
Figure 3:
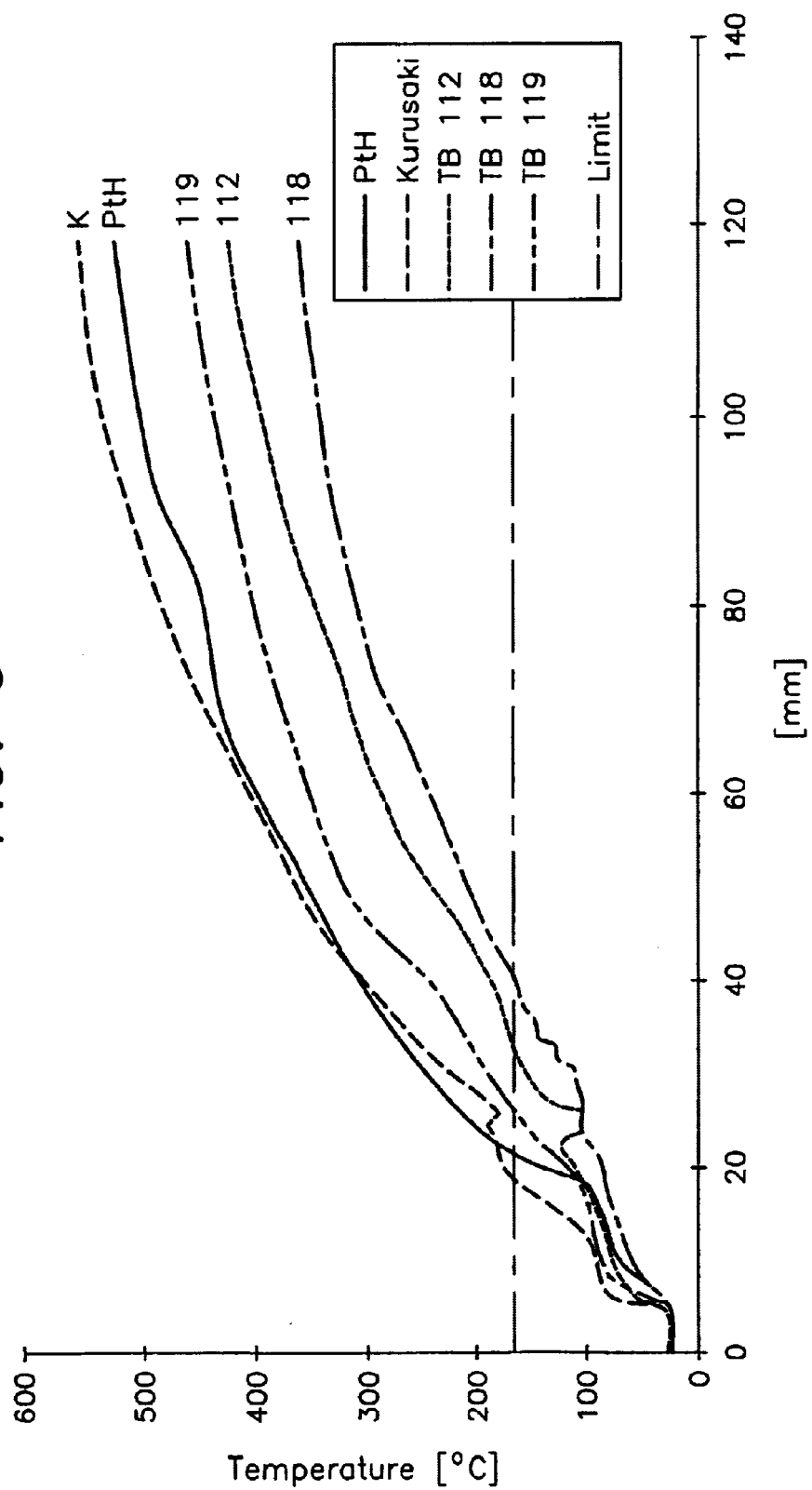
Figure 4:
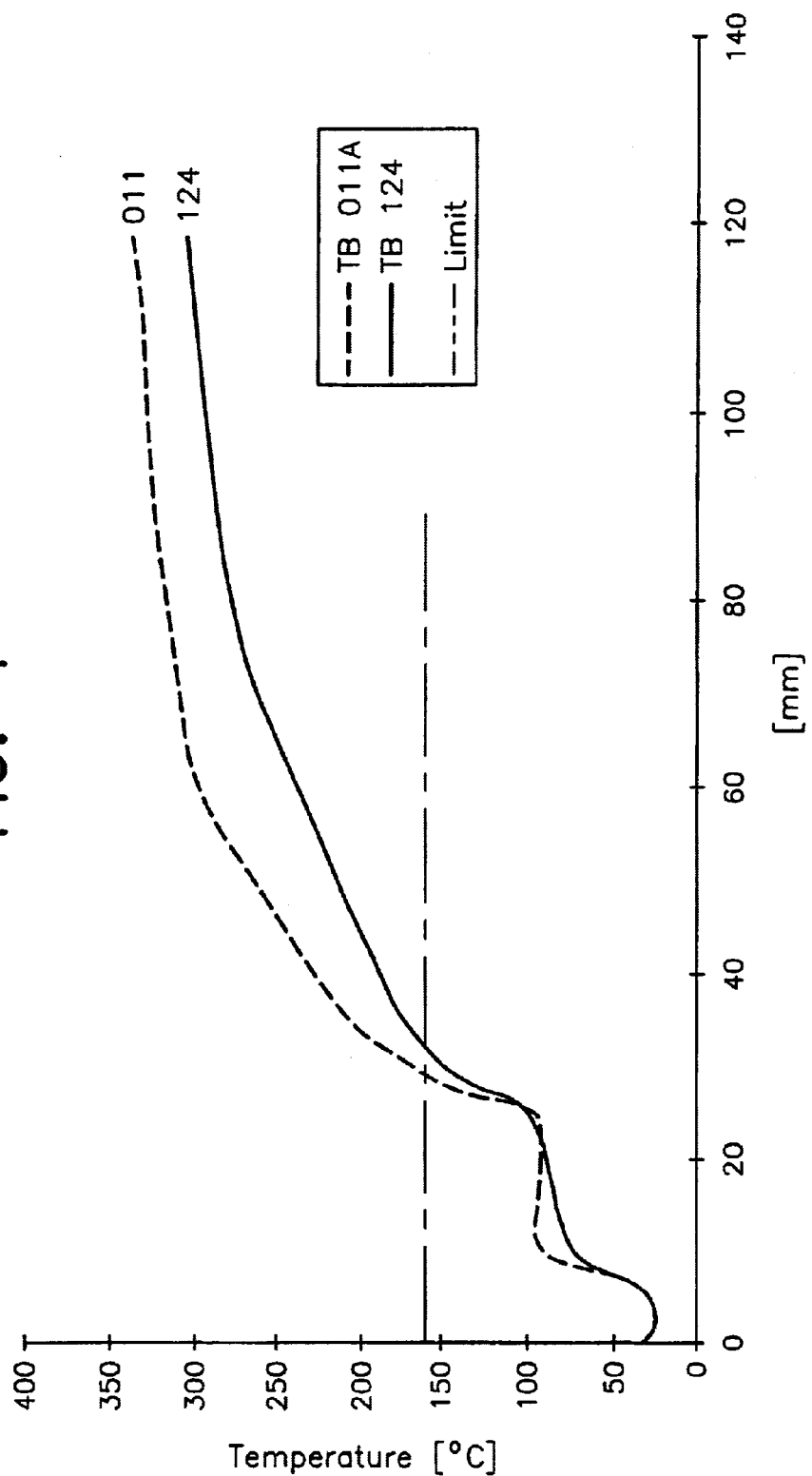
Figure 5:
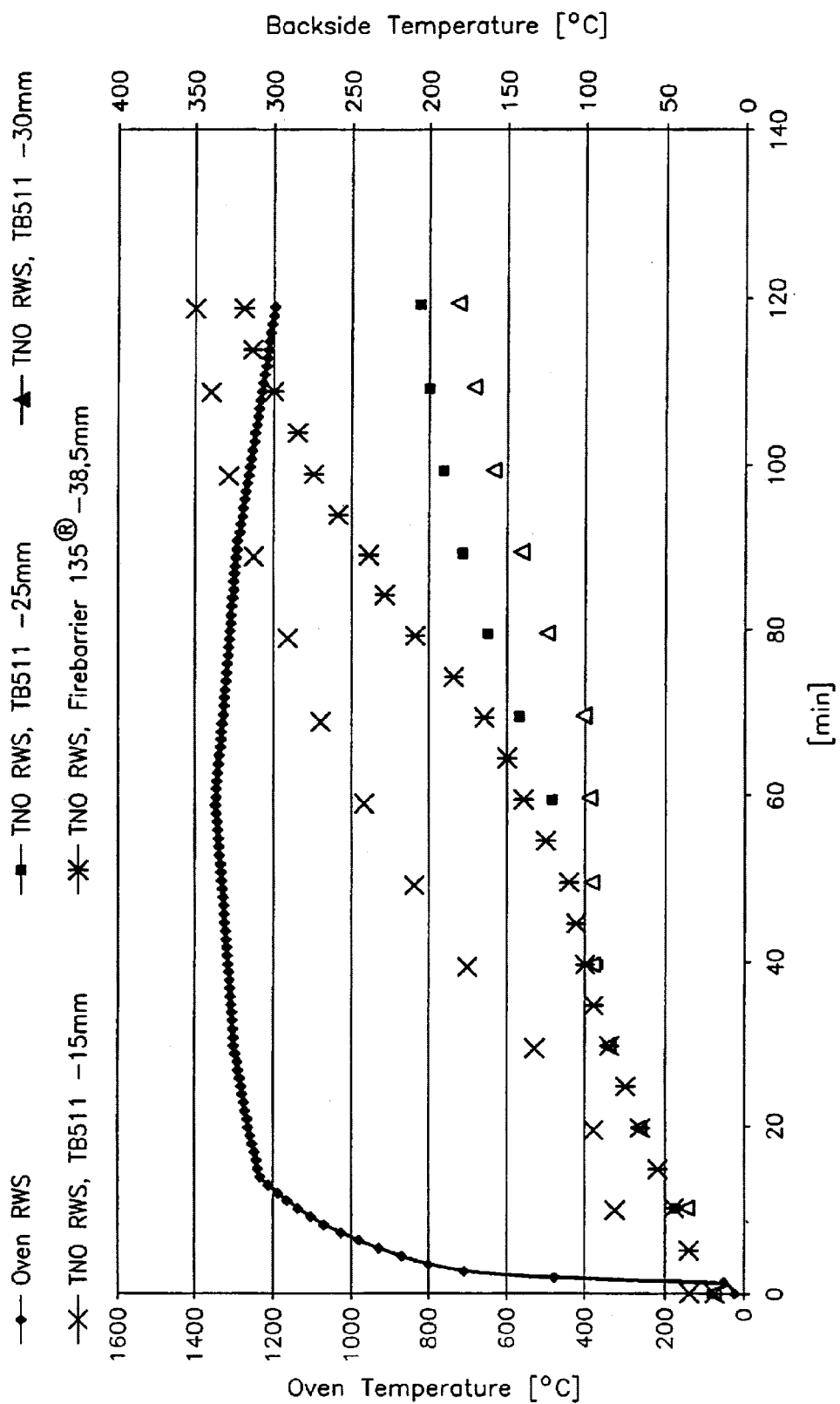
FIG. 5 graphically present the data from testing for five-protecting properties of material according to the invention and those obtained in accordance with commercially available material.

In the uncured state, the composition may contain Portland cement as an additional hydraulic binder and up to 50% by weight of fillers, optionally fibers, curing accelerators, curing delayers, plasticizing agents and foaming agents. In the cured state, it always contains less than 5% by weight of ettringite.

Preferably employed fillers include wollastonite and/or aluminum hydroxide, but optionally also tobermorite, which may be added in the form of needles or approximately spherical parts. As fillers, pearlites and/or vermiculites may also be added, preferably in an already expanded form. However, it is altogether possible to add these fillers entirely or partly in an unexpanded form. Further fillers may be expanded clays, expanded glass spheres or chamotte meal.

Further, fibers may be added to facilitate the preparation process and to reinforce the finished material. Suitable fibers include, for example, glass fibers, MMMF (man-made mineral fibers), cellulose fibers, organic fibers, such as PVA or PP.

Usual curing accelerators, curing delayers, plasticizing agents and foaming agents may be added, especially to facilitate the preparation process. These additives include calcium hydroxide, aqueous sodium hydroxide, sodium carbonate, calcium carbonate, lithium carbonate, borax, citric acid, aluminum hydroxide. Calcium carbonate is preferred; it acts as both a curing accelerator and as a suitable filler.

In the cured state, the material should contain virtually no or only a little ettringite. At any rate, the ettringite content should be always less than 5% by weight. While ettringite is a very important component essential to the invention in the material according to DE C 195 17 267, it is just the larger amounts of ettringite which result in clearly deteriorated properties at the high temperatures which may occur in a tunnel fire.

The preparation of the material in the form of prefabricated plates is preferably effected by casting or filter-pressing, but the Hatschek process or the flow-on process may also be applied. A usual method for the preparation of constructional parts of fibrous cement is the Hatschek process. In this process, a composition consisting of a cement-bonded matrix with inert and reactive fillers as well as of fibers is prepared with a significant excess of water and dehydrated through one or more cylinder molds. The non-woven fabric produced thereby is applied to a transport device, further dehydrated in a vacuum and wound onto a rotating cylinder, the so-called format roller, until the desired thickness of the constructional part has been achieved. The maximum thickness will then be from 25 to 27 mm. For example, the above mentioned commercial product Promatect H is prepared by the Hatschek process.

The amounts of aluminous cement and xonotlite employed according to the invention can be varied within the limits stated, but it is preferred for the composition to contain as many or twice as many weight parts of hydraulic binder as it contains weight parts of xonotlite.

By selecting the kind of fillers, the density of the material in the cured state can be varied within a range of between 0.7 and 1.3 $g/cm^3$, a density of about 0.9 $g/cm^3$ being preferred.

The cured material according to the invention has the property of being dehydrated in a stepwise manner predominantly within a temperature range of between 70 and 450° C. and thus is capable to absorb heat step by step and to reduce the increase of temperature in the region between the surface and the substrate to be protected. These properties can be enhanced by endothermic fillers. The most important component of the material is xonotlite, which by itself is a very good insulation material. As the xonotlite, in practice, synthetic xonotlite is used, which is obtained in the form of felted globules in the most frequently employed process. However, according to the invention, needle-shaped materials may also be employed, such as is obtained, for example, as a by-product in the processing of the spherical felted xonotlite.

The combination of xonotlite with the aluminous cement according to the invention produces the required optimum endothermic and insulating properties. Thus, the xonotlite becomes dehydrated only at about 800° C., being converted into wollastonite. This dehydratation is a strongly endothermic reaction and consumes much energy. The wollastonite formed thereby has a theoretical melting point at 1530° C. The combination of wollastonite and cured aluminous cement results in a minimization of shrinking and thus prevents the risks due to cracking during shrinking. Thus, the fire protection and insulation make use of various phase transitions and the dehydratation of the cured aluminous cement and xonotlite, retaining the spatial structure and mechanical stability.

Preferably, the material is employed in the form of prefabricated smooth or bent plates. However, it may also be sprayed on in a per se known manner, in which case it has to be taken care that the required minimum thickness of the coating is ensured and that the material adheres well to the substrate. The material according to the invention may also be used as a repair and joint mortar to repair broken off or burnt out parts of the material, ensuring the same or comparable properties of the repaired areas.

In the following Examples, the product according to the invention will be illustrated in more detail. From the comparative experiments with products of the prior art, it can be seen that the material according to the invention has clearly superior properties which could not be foreseen from the prior art.

EXAMPLE 1

The compositions of mixtures for preparing the product according to the invention are summarized in the following Table I.

TABLE I

| | Compositions (according to the invention) | | | | | | |
|---|---|---|---|---|---|---|---|
| Materials | casting TB008 | casting TB009 | casting TB010 | casting TB112 | casting TB118 | casting TB119 | filter press TB511 |
| Aluminous cement | weight parts | weight parts | weight parts | weight parts | weight parts | weight parts | weight parts |
| Lafarge fondu | 100 | | | 100 | | | 100 |
| Secar 51 ® | | 100 | | | 100 | | |
| Secar 71 ® | | | 100 | | | 100 | |
| Xonotlite suspension (10% dry xonotlite in water) | 160 | 160 | 160 | 160 | 160 | 160 | 225 |
| Wollastonite | | | | 15 | 15 | 15 | 15 |
| Vermiculite (0–2 mm) | 12 | 12 | 12 | | | | |
| Al(OH)$_3$ | | | | 35 | 35 | 35 | 35 |
| Exp. pearlites | | | | 5 | 5 | 5 | 5 |
| Bentonite | | | | | | | 4.5 |
| Cellulose (dry) | | | | 0.5 | 0.5 | 0.5 | 1.2 |

TABLE I-continued

| | Compositions (according to the invention) | | | | | | |
|---|---|---|---|---|---|---|---|
| Materials | casting TB008 | casting TB009 | casting TB010 | casting TB112 | casting TB118 | casting TB119 | filter press TB511 |
| Glass fibers | | | | 2.5 | 2.5 | 2.5 | 2 |
| PVA fibers | | | | | | | 2 |
| Plasticizing agent (35% in water/Plastijn sol.) | | | | 0.4 | 0.4 | 0.4 | |
| Density | 0.955 | 0.938 | 0.973 | 1 | 1 | 1 | 1 |

The compositions of the comparative mixtures are summarized in Table II.

TABLE II

| | Comparative composition (weight parts) | | |
|---|---|---|---|
| | casting TB011 | casting TB042 | casting TB043 |
| Aluminous cement | | | |
| Lafarge fondu (CFL) | 100 | 100 | 100 |
| Wollastonite | 60 | | |
| Exp. clay 0–2 mm | | 40 | |
| Exp. clay 2–4 mm | | 80 | |
| Glass spheres (Poraver ®) 0.25–0.5 mm | | | 40 |
| Glass spheres (Poraver ®) 1–2 mm | | | 60 |
| Water | 200 | 100 | 100 |
| Kaolin | 140 | | 5 |
| Gypsum | | 50 | 50 |
| Density | 1.22 | 1.2 | 0.85 |

The product TB011 is about the same as the commercial product Firebarrier 135.

The product Promatect H (briefly PtH) is prepared by the Hatschek process and cured in an autoclave (thickness of the plates 25 to 27 mm, density 0.9 to 1.0). Examination of these materials according to the Dutch test method yielded the values according to FIGS. I to V. It can be seen therefrom that the products TB008, TB112, TB118, TB119 and TB511 according to the invention have clearly better properties as compared to the comparative products TB042, TB043 and PtH. The test results of the comparative product TB011 were even worse than those of the products TB008 and PtH.

EXAMPLE 2

Material of TB511 according to Example 1 was processed into plates in the technical department and bonded with flat cement plates in different layer thicknesses of 15, 25 and 30 mm. The plates had a density of 0.900 kg/m³ and a residual moisture of 2.5%. The company TNO, an internationally known independent test laboratory in Holland, tested them for their fire-protecting properties according to the directions RWS (Rijkswaterstaat) in which a hydrocarbon fire is simulated.

For comparison, a layer with a thickness of 38.5 mm of the commercial product FireBarrier 135® (approximately corresponding to the composition TB011) was examined. The layer had a density of 1.257 kg/m³ and a residual moisture of 7.5%. This water results in a somewhat longer lasting fire protection. The test results are summarized in FIG. V. They show that the material according to the invention meets the minimum requirements already at a layer thickness of only 15 mm, i.e., to remain below 380° C. after 120 min on the backside, i.e., the contact area with the cement. The comparative product FireBarrier 135® achieves this object only at a layer thickness of 38.5 mm and a three times higher moisture content.

At layer thicknesses of 25 and 30 mm, the material according to the invention provides an essentially better fire protection. TNO already established a fire protection of at least three hours.

What is claimed is:

1. A fire-protection material for a construction made of concrete and prestressed concrete in the form of prefabricated plates or sprayed-on and cured coatings prepared from a hydraulically curing composition containing aluminous cement, wherein the cured material contains less than 5% by weight of ettringite, characterized in that the composition contains from 50 to 200 weight parts of aluminous cement and from 10 to 250 weight parts of xonotlite in the uncured state, the xonotlite being in the form of felted globules.

2. The material according to claim 1, characterized by being prepared from as many or twice as many weight parts of hydraulic binder as there are weight parts of xonotlite.

3. The material according to claim 1, characterized by containing additional Portland cement, fillers, fibers, curing accelerators, curing delayers, plasticizing agents and/or foaming agents in the uncured state.

4. The material according to claim 3, characterized in that the curing composition contains wollastonite, tobermorite and/or aluminum hydroxide as fillers.

5. The material according to claim 1, characterized in that the curing composition contains light-weight fillers selected from the group consisting of pearlites and/or vermiculites.

6. The material according to claim 1, characterized by containing fibers.

7. The material according to claim 1, characterized by having a density of from 0.7 to 1.3 g/cm³ in the cured state.

8. The material according to claim 1, characterized by being in the form of prefabricated plates prepared by casting or filter pressing.

9. The material according to claim 8, characterized in that said plates are in a bent form.

10. Prefabricated plate consisting of a fire-protection material according to claim 1.

11. The material according to claim 1, characterized in that the construction made of concrete and prestressed concrete is a tunnel.

* * * * *